United States Patent
Foss

(10) Patent No.: US 7,281,652 B2
(45) Date of Patent: Oct. 16, 2007

(54) POINT-OF-SALE PROVIDER EVALUATION

(76) Inventor: Jonathan G. Foss, 19765 Chartwell Hill, Shorewood, MN (US) 55331

( * ) Notice: Subject to any disclaimer, the term of this patent is extended or adjusted under 35 U.S.C. 154(b) by 0 days.

(21) Appl. No.: 11/131,606

(22) Filed: May 18, 2005

(65) Prior Publication Data

US 2006/0261144 A1 Nov. 23, 2006

(51) Int. Cl.
G06F 17/00 (2006.01)
(52) U.S. Cl. .......................... 235/375; 705/11
(58) Field of Classification Search ................. 235/375
See application file for complete search history.

(56) References Cited

U.S. PATENT DOCUMENTS

| | | | |
|---|---|---|---|
| 4,462,078 A | 7/1984 | Ross | 713/200 |
| 4,577,289 A | 3/1986 | Comerford | 360/60 |
| 4,584,641 A | 4/1986 | Guglielmino | 713/200 |
| 4,732,284 A | 3/1988 | Remmers | 211/188 |
| 4,734,796 A | 3/1988 | Grynberg et al. | 360/60 |
| 4,785,361 A | 11/1988 | Brotby | 360/60 |
| 4,817,140 A | 3/1989 | Chandra et al. | 705/55 |
| 4,849,836 A | 7/1989 | Kachikian | 360/60 |
| 4,866,769 A | 9/1989 | Karp | 705/56 |
| 4,888,800 A | 12/1989 | Marshall et al. | 380/281 |
| 4,903,296 A | 2/1990 | Chandra et al. | 705/56 |
| 4,907,093 A | 3/1990 | Ryan | 386/94 |
| 4,999,806 A | 3/1991 | Chernow et al. | 717/177 |
| 5,027,396 A | 6/1991 | Platteter et al. | 713/185 |
| 5,412,718 A | 5/1995 | Narasimhalu et al. | 705/51 |
| 5,509,070 A | 4/1996 | Schull | 705/54 |
| 5,513,260 A | 4/1996 | Ryan | 380/200 |
| 5,563,946 A | 10/1996 | Cooper et al. | 705/56 |
| 5,598,470 A | 1/1997 | Cooper et al. | 713/165 |
| 5,619,558 A * | 4/1997 | Jheeta | 379/92.01 |
| 5,673,316 A | 9/1997 | Auerbach et al. | 705/51 |
| 5,689,560 A | 11/1997 | Cooper et al. | 705/52 |
| 5,737,416 A | 4/1998 | Cooper et al. | 705/52 |
| 5,950,172 A * | 9/1999 | Klingman | 705/26 |
| 6,505,168 B1 | 1/2003 | Rothman et al. | 705/10 |
| 6,520,542 B2 | 2/2003 | Thompson et al. | 283/51 |
| 6,609,120 B1 | 8/2003 | Honarvar et al. | 707/3 |
| 2002/0107717 A1* | 8/2002 | Liu et al. | 705/10 |
| 2004/0044563 A1* | 3/2004 | Stein | 705/10 |
| 2004/0143478 A1* | 7/2004 | Ward | 705/10 |
| 2005/0149382 A1* | 7/2005 | Fenner et al. | 705/10 |
| 2005/0192958 A1* | 9/2005 | Widjojo et al | 707/5 |

* cited by examiner

Primary Examiner—Michael G. Lee
Assistant Examiner—Tae W. Kim
(74) Attorney, Agent, or Firm—Mark A. Litman & Associates, P.A.

(57) ABSTRACT

A system provides information indicative of customer satisfaction respecting at least one service or sales provider, the system including at least one customer information entry component that provides customer input to a database supported by a financial service provider that assists point-of-sales or point-of-service payment to a site. The system can segregate or aggregate accumulated customer input data according to at least business one customer of the financial service provider. At least one business customer can access information from the accumulated customer input data that relates to data relating to that specific business customer. The system can provide alerts and/or can relate the data in its variance to the customer's historical average scores. A method of providing information to a master business site regarding a subordinate business site comprises providing the subordinate business site with a point-of-sales or point-of-service data input for local customer site evaluation data to be provided by a local on-site primary customer, data input and data reception being directly associated with a financial service provider electronically supported economic transactions and transmitting data relating to both the economic service and the local customer site evaluation data to a processor that receives both the economic transaction data and the local customer site evaluation data.

5 Claims, 2 Drawing Sheets

POINT-OF-SALE PROVIDER EVALUATION

BACKGROUND OF THE INVENTION

1. Field of the Invention

The present invention relates to goods and service providers and service facilities, the rating and evaluation of goods and service providers and service facilities by customers, particularly at point-of-sales locations. The present invention also relates to reward systems for customers or clients as part of a point-of-service/point-of-sale transactions with client/customer input. The present invention also relates to systematized reports and signals to the primary service provider based upon those ratings at point of sales locations.

2. Background of the Art

Rating or reward systems are fairly common within the commercial and service business fields. The majority of rewards and ratings are directed towards the customers or clients and the information is used by the servers or businesses themselves to help evaluate individual clients or client groups for service or sales targeting. Typically data is collected on individual customers/clients and their patterns of sales and business utilization patterns are evaluated, ranked and/or rated to provide the business with information on how sales can be increased. For example, U.S. Pat. No. 6,505,168 shows a computer implemented system for storing and manipulating customer purchase information received from a plurality of sources, the computer system comprising a storage device for storing the customer purchase information and a processor for placing the customer purchase information, a method for organizing the customer purchase information comprising the steps of: creating an organizational structure in the storage device, wherein the organizational structure comprises a plurality of categories, each category comprising a plurality of sub-categories arranged in a hierarchy; receiving the customer purchase information; and placing the customer purchase information into at least one of the plurality of categories and the plurality of sub-categories using the processor. Mailers (as described in U.S. Pat. No. 6,520,542) are also used to obtain information and/or provide awards.

Other consumer ratings systems exist whereby consumers can register their opinions about particular service businesses over the Internet. Unfortunately, these systems allow consumers to volunteer ratings for businesses not recently, or indeed never, used by the particular consumer. Still other electronic ratings systems are tied to specific "e-commerce" transactions over the Internet. However, most local businesses reside in the "bricks and mortar" world.

It is equally important for service and sales providers to appreciate and determine the customer's/client's perception of the point-of-sale or point-of-service business relationship. Collection of such information has been difficult to obtain and has not tended to be reliable. Such collection systems have included cards left on restaurant tables that are voluntarily completed by customers, hand-out sheets given to attendees, postcards provided along with sales or service provided to customers or clients, personal debriefing by sales personnel, focus groups, mailed out questionnaires, telephone surveys and the like. Good faith responses to such solicited reviews are traditionally at a rate of less than 2%, and the reviews tend to be either a) heavily weighted towards unfavorable response, as the unfavorable results motivate response more than expected good service/sales results or b) highly favorable where the service provider is performing the interview and filling out the rating sheet.

SUMMARY OF THE INVENTION

Client/customer opinion data relating to point of sales or point or service performance and/or quality and/or satisfaction is provided during or at the immediate conclusion or shortly after execution and can be stored or transmitted for storage for immediate and/or subsequent evaluation of personnel or site performance by the business where the service or sale or other transaction occurred. The data can be reviewed and analyzed with respect to performance criteria, and the data may also be used to compare performance criteria among sites, especially where new strategies or programs are being implemented to gauge the effects of the strategies on a time basis. A system of strategy evaluation as described in U.S. Pat. No. 6,609,120 may be used, for example, or any other comparative or evaluative software designed by the company or business.

Point-of-sales or point of service information is provided by the customer into a business or service provider information system that may be directly connected with payment functions for the sales or service. For example, information may be provided along with the credit card transaction, debit card transaction, personal account transaction, electronic check transaction or with a format associated with a cash transaction. Discounts may be provided to the customer/client and/or may be a service provided through the transaction support service (e.g., bank, debit card company or credit card company) for which the business/service provider may also pay a service fee. The customer-provided data is then provided to or access allowed to the business or service provider. Rewards and incentives may be given to primary service providers for excellent service to provide a further justifiable reason for the expense of this system.

DETAILED DESCRIPTION OF THE INVENTION

Figure 1:
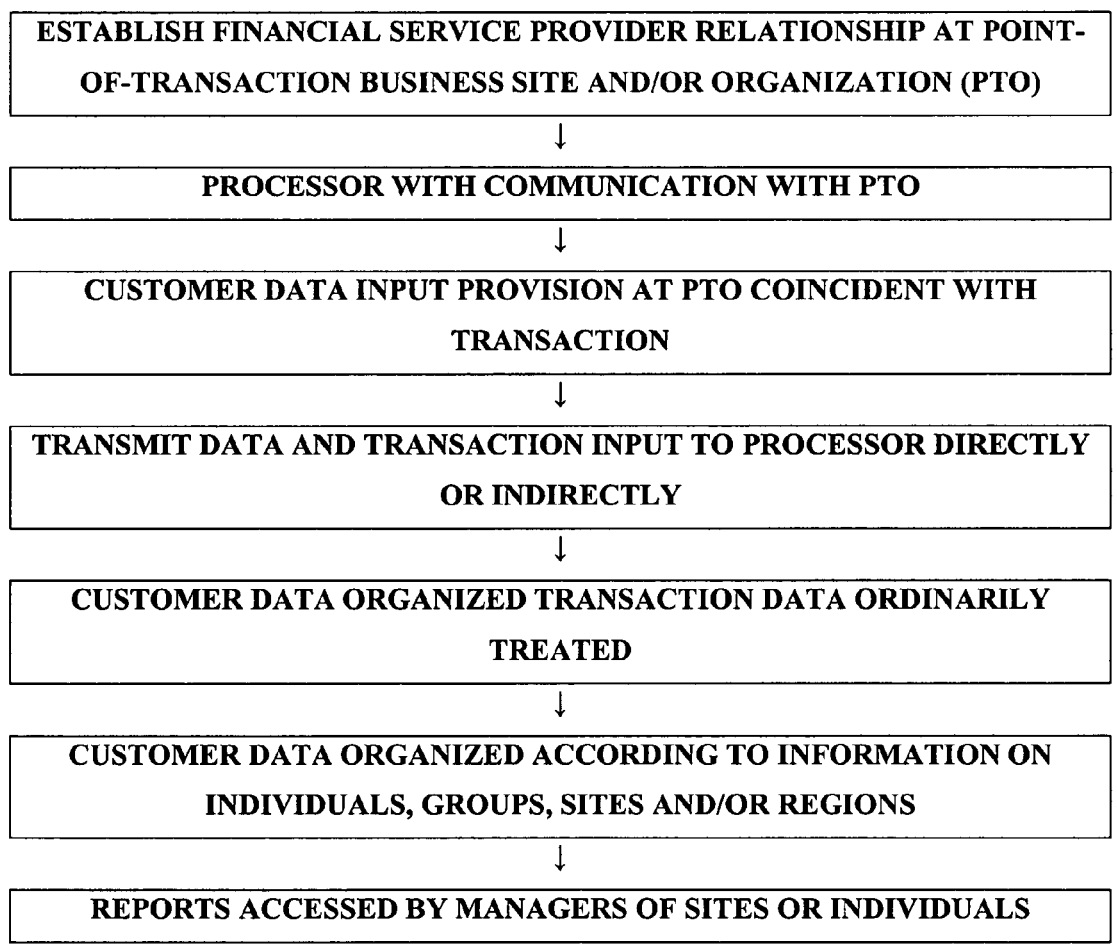
FIG. 1 shows a flow chart of a process that may be performed according to practices and technology described herein.
Figure 2:
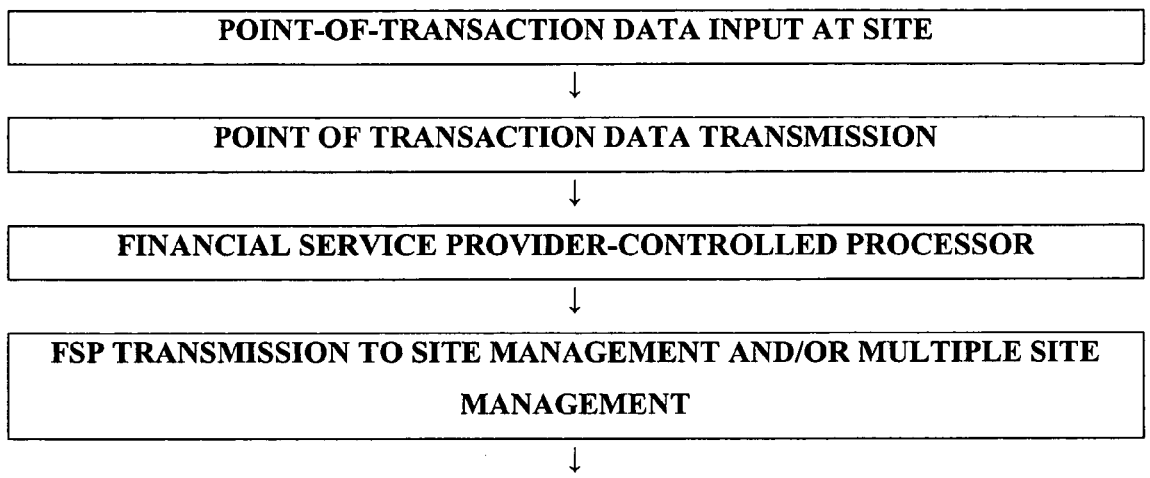
FIG. 2 shows a schematic of a system that can support a process that may be performed according to practices and technology described herein.

A number of capabilities, processes and systems are described herein that can be performed on existing equipment with software that can be readily constructed and written based on the teachings provided herein. On-line sales equipment and transactional messaging equipment and other electronic reading, input and storage systems are common in the market and can be adapted to the practices described herein.

The term customer is to be interpreted broadly, unless otherwise limited, as the party that is receiving the goods or services in any transaction or event. The customer may be a business, a representative of a business or a private individual.

The terms "sales" and "services" are to be interpreted in their broadest context as inclusive of any economically based transaction, unless specifically limited to particular forms of sales and services. A non-limiting list of sales and service might include, by way of non-limiting example, stores, outlets, telephone sales and on-line sales and service connections for food (e.g., restaurants including fast food restaurants, delivery services, food clubs, grocery stores, delicatessens, specialty food locations such as candy stores, buffets, bulk food stores/outlets, etc.), clothing (e.g., department stores, general stores, specialty stores, outlet stores, seconds or previously worn stores, consignment stores, malls, fitters, laundry, cleaners, tailors, accessory stores), manufactured goods (e.g., jewelry, time pieces, hats, scarves, shoes, athletic equipments, sports equipment, exercise equipment, electronic goods, computers and components, video equipment, audio equipment, headphones, telephones, wireless communication systems and components, automobiles, bicycles, motorcycles, scooters, etc.), repair stores and shops (e.g., auto repair stores, electronic repair stores, mechanical repair stores or fixit shops, etc.) and other service locations (e.g., optometrists, stock brokers, insurance advisors/sales, legal services, public or governmental services, airline reservation services, insurance representatives or adjustors, sales representatives, hotels, resorts, casinos, etc.) and any other sales or service event (including, but not limited to sports events, pay-per view events, movies, theatres, etc.).

The point of sales event or point of service event is ordinarily accompanied by a form of memorialization, whether in a sales slip, charge slip, account entry or the like. A customer is provided with an opportunity to attach data input with the memorialization in a facile manner. For example, with many credit card/debit card systems, a touch screen is provided that indicates the transaction and acceptance of the transactions. Implementing a process and system as described herein, part of the screen or an additional screen could provide the opportunity to input data on the sales/service event or facility, or the screen or additional screen may require such input to complete the transaction. It is also possible that the customer can be provided an incentive to perform the input. Such incentive could be a fixed amount per transaction where input is provided (e.g., $0.01/transaction with input, $0.05/transaction with input, etc.), a percentage reduction in transaction cost (e.g., 0.01% up to a maximum value amount, 0.05% up to a maximum value amount, 0.1%, 0.2%, 0.5% etc. up to a maximum value amount), the transaction customer may be a specially treated or "exclusive" customer (e.g., card-holder) who receives a discounted monthly loan rate on charges, or any other form of award, such as 'points' that may be accumulated towards prizes, benefits, awards, discounts, discounts with specific companies (e.g., airlines, frequent flyer miles, hotels, vacation clubs, food stores, consumer stores or consumer clubs, and the like) or any other form of benefit.

The form of input may be a card swipe, WiFi input, voice recognition input, touch screen, PALM device, keyboard (less preferable), or data input by pencil on the sales/service/charge slip that can be mechanically read or read and entered by staff personnel (also less preferred because of the possibility of staff modification, alteration or origination of purported customer input). The format of the customer should be simplified to minimize any perceived inconvenience, yet provide the information desired by the ultimate information requestor. For example, formats of touch screen inputs for various types of businesses or services could include, by way of non-limiting examples:

| Food Services | | | | | | | | | | |
|---|---|---|---|---|---|---|---|---|---|---|
| | Order accuracy | | | | | | | | | |
| | $^i$100% | | $^i$75% | | $^i$50% | | $^i$25% | | $^i$0% | |
| Courtesy (10 Best) | $^i$10 | $^i$9 | $^i$8 | $^i$7 | $^i$6 | $^i$5 | $^i$4 | $^i$3 | $^i$2 | $^i$1 |
| Cleanliness (10 Best) | $^i$10 | $^i$9 | $^i$8 | $^i$7 | $^i$6 | $^i$5 | $^i$4 | $^i$3 | $^i$2 | $^i$1 |
| Food Quality (10 Best) | $^i$10 | $^i$9 | $^i$8 | $^i$7 | $^i$6 | $^i$5 | $^i$4 | $^i$3 | $^i$2 | $^i$1 |
| Value (10 Best) | | | $^i$10 | $^i$9 | $^i$8 | $^i$7 | $^i$6 | $^i$5 | $^i$4 | $^i$3 $^i$2 $^i$1 |
| Recommend us? | $^i$1 $^i$2 $^i$3 $^i$4 $^i$5 (best) | | | | | | | | | |
| Frank (server) | $^i$1 $^i$2 $^i$3 $^i$4 $^i$5 | | | | | | | | | |
| Carl (host) | $^i$1 $^i$2 $^i$3 $^i$4 $^i$5 | | | | | | | | | |
| Short comment _____ | | | | | | | | | | |

The individual primary service provider names may be added automatically by local processors in each shop, may be logged into by the manager or sales provider at the register, may be used with a wireless communicator entering the financial transaction, by the customer selecting from a list, or in any other facile manner. With restaurant where individual worker performance is important and location (e.g., store location in a chain) is important, the transaction may be stamped at each register, each PALM, each charge transaction with a server ID and/or store ID so that consumer data can be provided for each specific server/employee and each store for facile analysis. A customer identifier would also be included in the transaction, but of course, this could be provided by the credit card, debit card, check or club member number of identification. As can be seen from this example, the provision on the touch screen (where signatures are now accepted in financial transaction) of this type of customer input could be easily done in less than a minute. The customer could have an indication of reward displayed on the screen immediately (e.g., "Customer 227.1415 has earned 5 more Card points"), total value received in the program can be displayed (e.g., "Customer 227.1415 now has accumulated 5,340 Card points"), price discount (e.g., "Customer 227.1415 will be discounted 0.05% or $0.56 on this transaction") and the individual award or value to the customer and/or a cumulative award or value can be provided on statements from the provider that is assisting in the obtaining of the data, for example, a bank or credit card provider.

There is a significant potential for economic gains for the provider in this system also. The provider (it will be assumed for simplicity that this is a credit card provider) can have a contract established with all stores in a chain (e.g., GAP, Nordstrom's, Circuit City, Caribou Coffee, etc.) that it will charge the company a fixed amount of a percentage amount for each transaction that is accompanied by client input in the transaction. If the transaction, for example, is paying a fixed amount of $0.5 to the customer for the input, the provider may charge the point of sales/service business $0.06, $0.07, $0.08, $0.09, $0.10 etc. per transaction. The traditional fees charged to the business in credit card transactions (e.g., 0.2% to 6% of the transaction) may be increased, or the program may be part of an incentive business development, store expansion, market share strategy by a single company (e.g., VISA, American Express, Master Charge, etc.), where the attractiveness of the program to both the customer and the business will increase the volume of business of the credit card company.

| Electronic Consumer Store | | | | | | | | | | |
|---|---|---|---|---|---|---|---|---|---|---|
| Store Location (10 Best) | i10 | i9 | i8 | i7 | i6 | i5 | i4 | i3 | i2 | i1 |
| Service (10 Best) | i10 | i9 | i8 | i7 | i6 | i5 | i4 | i3 | i2 | i1 |
| Selection (10 Best) | i10 | i9 | i8 | i7 | i6 | i5 | i4 | i3 | i2 | i1 |
| Price (10 Best) | i10 | i9 | i8 | i7 | i6 | i5 | i4 | i3 | i2 | i1 |
| Technical Knowledge (10 Best) | i10 | i9 | i8 | i7 | i6 | i5 | i4 | i3 | i2 | i1 |
| Courtesy (10 Best) | i10 | i9 | i8 | i7 | i6 | i5 | i4 | i3 | i2 | i1 |
| Cleanliness (10 Best) | i10 | i9 | i8 | i7 | i6 | i5 | i4 | i3 | i2 | i1 |
| Can we call you about this ?___#___-___-___ | | | | | | | | | | |
| Your Email address _____ | | | | | | | | | | |

Again, the time needed for the customer to fill out this information is quite modest and there are benefits to the provider, the business and the customer. By providing the input for customer data in the point of contact situation (sales or service) and providing it in the on-line transaction (e.g., credit card, debit card and/or on-line check) not only is the input from the customer inherently confirmed, but also the requested information can be reformatted easily by the business and have it displayed to the customer easily. For example, if a new service program was being instituted, special questions could be provided such as:

Has the service representative already explained the new Premium Warranty Program to you? Yes⬜ No⬜

If No, please ask him about this high value program. Did you understand the program when he explained it to you? Yes⬜ No⬜

In this manner, businesses can track whether programs are being implemented as desired and can evaluate the store-by-store compliance and the effects that the program is having according to employee commitment. The performance of individual store employees and managers can also be evaluated on the basis of customer input.

Another way of describing this technology includes a system that gathers consumer feedback to rate businesses according to predetermined criteria by direct point-of-sales or point-of-service contact. The ratings information developed thereby is made available to the business itself or even to members. The business can determine the quality of performance of individual employees, individual managers, and individual stores. Employees, mangers and stores can qualify for awards, bonuses and incentives based upon the ratings. The customers could be allowed to make a selection of a local business based upon the customer satisfaction experiences of others (and it is possible that the ratings could be published). A method, and a system for implementing this technology, for updating the ratings on a real-time or near real-time basis, based on specific, verified transactions between consumers and businesses.

When a business is evaluating a unit or site, or a customer is searching for a local service, the problems can be daunting. Trillions are spent annually with millions of sales and service companies in the United States alone. Searching through the available services or reviewing the performance of individual stores or service locations is not an easy task.

One evaluation method for customers has been to turn to those who make available evaluations and surveys through magazines, ranking various businesses and services according to predetermined criteria. This heavily relies upon a single person's or small group of persons' opinion.

In one aspect, the technology described herein involves identifying a transaction between a customer and service provider at the time that or soon after the transaction is consummated and paid for, and associating the customer input with consummation or transmission of the sales payment or agreement to pay. The service should be provided through the transaction itself, and benefits to the customer can be used as an incentive for providing the information. A communication medium, including a conventional Internet connection or line connection that is used with credit card and/or bank card and/or on-line checking, to communicatively interconnect the customer, the service provider business, and a Financial Service Processor (e.g., bank or credit card processing company). Using the Internet connection, the customer registers a financial services account number (e.g., a credit card number or a checking account number) at the point of sales or point of service. A database containing this customer's financial services account number together with those of other similarly registered customers or buyers confirms the customer's identification and is forwarded to and stored by the Financial Service Processor. This data base may be accessed by the business on arrangement or contract with the Financial Service Provider. One significant advantage of this system is that the records of the Financial Service Providers tends to be very secure, and information for individual business customers (the stores, etc.) can be segregated into unique files so that businesses can access their own unique information and the information from other businesses cannot be readily obtained. This system is less intrusive than systems disclosed in U.S. Published Application No. 20040044563 wherein a register customer makes a purchase of a service from a certified service provider, and pays for that service with a credit card or check or other electronic payment means tied to a financial services account number previously registered with a particular primary server or particular primary server site, that purchase will be detected at the Financial Service Processor. The primary server will notify the Financial Service Processor of the purchase. This notification will trigger the transmission of an email about the consumer/customer sale and input with a simple electronic form that asks for information concerning the customer's satisfaction of the service received. Upon receipt of the filled-out form, the Financial Service Provider automatically updates the database containing the information about the business. The forms tends to be too detailed and the communication is not easily made to the point of sales or service in a convenient time frame, as there must be multiple communications for the information to return to the point of sales. There is also little or no benefit to the customer, individual server, individual manager or individual store in having this information under other evaluation programs and systems.

As used herein, a Financial Service Processor (FSP) is a financial payment service of one type or another. For example, an FSP may be a bank with which the service provider does business, or with which a customer has a checking account, or it may be a credit card processing company. Alternatively, it may be an on-line payment service, or it may be a check verification service. As will be seen, any of these services will operate with the present invention.

Additional considerations in online systems include at least line and transaction security. Software-based encryption techniques prevent conventional copying programs from making unauthorized usable copies. Generally, in these protection techniques, the execution of programs or information stored on a storage medium involves the presence of decryption key for display or execution of data. U.S. Pat. No. 5,027,396 ('396) describes a technique for execution protection of a floppy disk using an encrypted password located at an arbitrary location within the data. Other examples of prior art teachings discussed and referred to in U.S. Pat. No. 5,027,396, incorporated herein by reference, are directed towards copy-protecting disks or storage media in general see for e.g. U.S. Pat. Nos. 4,577,289; 4,462,078; 4,584,641; 4,734,796; 4,785,361; 4,849,836. In the prior art a technique for restricting access and use of digital information to a particular machine or "anchoring" content to a single machine is described in U.S. Pat. No. 4,817,140 assigned to IBM. This technique is also referred to as hardware based authorization. U.S. Pat. No. 4,732,284 describes a hardware authentication utilizing public-key encryption techniques. Other examples of secure communication systems utilizing encryption or controlled distribution are described in U.S. Pat. Nos. 4,888,800 and 4,999,806. Combinations of software based method and hardware key are described in U.S. Pat. Nos. 4,866,769 and 4,903,296. A method for preventing copying of a video program is described U.S. Pat. No. 4,907,093. A method of preventing unauthorized duplication of information from one storage medium to another and further restricting the use of information to one or more designated devices is described in U.S. Pat. No. 5,412,718. U.S. Pat. No. 5,513,260 describes a method and apparatus for copyright protection of various recording media such as compact discs (CDs) utilizing a combination of symmetrical and asymmetrical data encryption to permit the player to handle either copy-protected or non-copy-protected media. A method for invoking business operations and encouraging purchase of executable and non-executable software for distribution of digital information is disclosed in U.S. Pat. No. 5,509,070. This method requires the user to obtain an ID unique to the user for obtaining access to the advanced features. Another method of protecting digital information particularly software is making the software product available for a pre-determined and limited time period such that the program is rendered unusable after the expiry of the allowed time-period. Methods and apparatuses for enabling trial period use of software products are covered under U.S. Pat. Nos. 5,563,946, 5,598, 470, 5,689,560 and 5,737,416. A limited trial period can be effective for software products; however, it does not provide a solid business model for delivering other digital content such as books, music and movies due to several reasons. Firstly, even a singular use of the content is disincentive enough for paying or purchasing and secondly, once access is provided in a decrypted form it can be readily stored, displayed and distributed after the trial period has expired. A method and apparatus to create, distribute, sell and control access to digital documents using secure cryptographic envelopes is described in U.S. Pat. No. 5,673,316 assigned to IBM Corporation. This technology has been commercialized under the IBM's trademark CRYPTOLOPE™. Cryptolope™ objects are used for secure, protected delivery of digital content. Cryptographic envelopes can be compared to the other major technical approach to the same problem, secure servers. A Cryptolope™ is a self-contained and self-protecting object and may include a variety of content types including text, images and audio. It can be delivered across a network or placed on a CD-ROM or other storage media and ties the usage conditions (for e.g. price) to the content itself. Commercial information and data may be in a filed description of the Cryptolope™ technology, which can be obtained from the IBM website using the link—http://www.ibm.com/software/security/cryptolope/about.html. Any other format of encryption and protection that meets the levels of security needed by the system, such as Public key—private key encryption and verification systems, Zero Knowledge Proof verification systems and the like may be useful.

Additionally, there may be procedures involved in character recognition are the same as in the first embodiment, so no further description thereof is given here. A CPU decides whether or not to approve the credit card member registration based on the recognized characters. When it decides that member registration is possible, a credit card is issued and sent to the user. When a credit card is issued, handwriting X(t) and Y(t) data for the signature of the user are registered with the card company. The signatures so registered are used for certification purposes. When, on the other hand, it is decided that member registration is not possible, a notice to that effect is sent to the user. Thus, based on this embodiment, the information written on the member registration form using the reading apparatus 10 is sent directly to the card company(s), wherefore the time required for member registration processing can be shortened as compared to when the member registration form is sent by mail.

Card use processing is described next. After a user makes a purchase in a subscriber store (Ti), when he or she presents his or her credit card to a store clerk, the store clerk uses the imprinter 1b to transfer the member number, etc., on the credit card to the card voucher. Next, the store clerk reads the magnetic stripe on the back of the credit card using the card reader of the reading apparatus. The reading apparatus transmits the member number, etc., so read to the card company(s) via the communication infrastructure. The character recognition apparatus at the card company(s) receives the member number, and verifies whether that member number is valid. Upon verifying that the member number is valid, the character recognition apparatus issues an authorization number, which it transmits back to the reading apparatus via the communications infrastructure. The reading apparatus 10 receives the authorization number and displays it on the LCD. Seeing this, the store clerk recognizes that the credit card has been approved for use, and, using the pen, enters the purchase amount on a card voucher that is placed on the reading apparatus. The digitizer detects the coordinates of the pen, and outputs the changes over time in those coordinates as handwriting X(t) and Y(t) data. The output handwriting X(t) and Y(t) data are stored in the handwriting data memory.

Next, the store clerk may have the user write his or her signature on the card voucher placed on the reading apparatus. The user writes his or her signature on the card voucher using the pen. This signature also is stored in the handwriting data memory as handwriting X(t) and Y(t) data. These handwriting X(t) and Y(t) data for the purchase amount and signature are transmitted to the character recognition apparatus via the communications infrastructure. The character recognition apparatus receives these handwriting X(t) and Y(t) data, and performs character recognition based thereon. The details of this character recognition processing are as noted for the first embodiment, so no further description is given here. The character recognition apparatus performs data checking on the results of the character recognition. If there are characters other than numerals inside the purchase amount data field, an error is indicated as the result of the data checking. An error will also be indicated as the result of data checking when the product unit prices and purchase amount total are inconsistent. By performing such data checks, erroneous character recognition can be discovered.

Furthermore, when the user's signature has been registered by the card company(s), signature comparison processing is performed. More specifically, the character recognition apparatus makes a comparison to determine whether the signature transmitted from the subscriber store matches the pre-registered signature. If the two signatures do not match, that is, when the credit card user is not a valid user, the character recognition apparatus disallows the purchase to be transacted. If the two signatures do match, on the other hand, the character recognition apparatus allows the purchase to be transacted. The results of this comparison are transmitted to the reading apparatus, and displayed on the LCD log. Seeing this display, the store clerk gives the card voucher copy to the card user only when a match is indicated. The card company copy 1e is sent to the card company(s) at a later date.

There may be at least one version of a configuration of computing apparatus as may be found at a consumer or point-of-sales/point-of-service location. This may be, by way of non-limiting example, a transactional input system such as credit card swipe with keypad, credit card swipe with touch screen, PALM access, voice activated (after a phone purchase) etc. which may be connected to a local processing system, possibly including a central processing unit and various peripheral equipment such as floppy and hard drives, CD ROM readers, and the like, which is also connected to the central processing data collecting system for the operation of the technology and business. The consumer at the point of sales or point of service may also use a conventional pointing device (e.g., mouse or track ball; not shown) of one sort or another for point-and-click selection operations. Written Credit, charge, debit or electronic check documents (e.g., paper hard-copy forms) may contain primary customer data input for pencils, pens, markers or other "fill-in-the-blank" machine readable or visually readable data entry customer input. These slips may be run through a reader scanner and the data transmitted along with the economic data transmission, which mat often be manually input from such slips. The communication device preferably provides Internet access (via an appropriate ISP) or dedicated line to the Financial Institution and may take the form of a standard modem connection to the telephone lines. Alternatively, the communication device may be of a type that provides ISDN, DSL, ASDL, cable, or even a satellite dish connection. The consumer point of sales or point of service connection could be a conventional television set on site with a WebTV (for example) connection rather that the PC system. (WebTV is a registered trademark of Microsoft Corporation of Redmond Wash.)

The information provided by the consumer to the Rating Company is placed in the database maintained by the Financial Service Provider. The list of service providers certified by the Financial Service Provider will also be in the database, possibly together with the merchant number(s) of each certified service provider. This will allow the Financial Service Providers (FSP) to certify customers to the businesses (by the associated customer number(s)) from whom services have been purchased with credit cards or checks or on-line payments drawn on checking accounts that have been registered with the FSP. The information provided to the companies at point-of-sales or point-of-service on a evaluation level may or may not include the customer identifier, as that information is not important for a site evaluation program for the business. There would be little concern for customer security issues between the client and the business, as the customer has already provided the FSP information (credit card etc.) to the business. This information would not be sent to third parties, including competitive companies except by agreement from the primary company that has a contract for services with the FSP for its own desired information. Each company may readily design and tailor the content of the questions presented to customers easily.

A transaction is consummated between a consumer and a point-of-sales or point-of-service provider associated with the FSP. The credit card transaction data is transmitted along with the response questions, e.g., via a communicative network (e.g., via a dedicated line) to the FSP for payment. The FSP node will include the financial transaction and the consumer response information into its database. An algorithm or data entry profile may be used to provide the information into a desirable form, such as indicating performance on all of the available levels (individual employee, all employees, individual manager, local management, store, regions, etc.) for review by management of the business. This can be directly accessed from the FSP system by the business through communication with files of the business segregated from common access by the FSP.

Having identified use of a registered credit card or check or on-line payment tied to a registered bank account for a transaction with a certified company, the FSP can certify the data, the date of the transaction, and the appropriate ratings at the site. Signals may be set up when specific data results trigger a response, as with an undesirable level of performance or outstanding performance. This notification may be able to prompt the FSP to conduct a search of its database for information related to the particular site or employee.

While the present invention has been described in terms of various embodiments, it will be apparent to those skilled in this art that various modifications and alterations can be made. Therefore, although the invention has been described in terms of several specific embodiments, it should be understood that the invention is not limited to the disclosed embodiments. To the contrary, the present invention is intended to cover various modifications and equivalent structures included within the spirit and scope of the appended claims.

The invention claimed is:

1. In a system for providing information to a major business site indicative of customer satisfaction at subordinate business sites respecting at least one service or sales provider at subordinate business sites, the system including at least one customer information entry component that provides customer input to a database reviewed by the major business site supported by a financial service provider that assists point-of-sales or point-of-service payment to a subordinate business site wherein the site can segregate accumulated customer input data according to at least business, one customer or the financial service provider, wherein the sales provider can access information from the accumulated customer input data that relates to data relating to that specific business customer.

2. The system of claim 1 wherein the sales provider can relate the data with respect to its variance to that business customer's historical average scores.

3. The system of claim 1 wherein the sales provider can access the system to provide data with respect to data relating to that business service provider's scores.

4. The system of claim 3 wherein the sales provider can relate the data with respect to variance of that business customer's historical average scores.

5. The system of claim 1 where the service provider can relate the data with respect to variance of that service provider's historical average scores.

* * * * *